United States Patent
Seifi

(10) Patent No.: US 7,107,283 B2
(45) Date of Patent: Sep. 12, 2006

(54) RELATIONAL JOB QUEUE

(75) Inventor: Mustafa Seifi, Irvine, CA (US)

(73) Assignees: Kabushiki Kaisha Toshiba, Tokyo (JP); Toshiba Tec Tabushiki Kaisha, Tokyo (JP)

( * ) Notice: Subject to any disclaimer, the term of this patent is extended or adjusted under 35 U.S.C. 154(b) by 413 days.

(21) Appl. No.: 10/156,390

(22) Filed: May 28, 2002

(65) Prior Publication Data

US 2003/0225721 A1 Dec. 4, 2003

(51) Int. Cl.
*G06F 17/30* (2006.01)

(52) U.S. Cl. ............. 707/103; 707/104.1; 707/10; 707/1

(58) Field of Classification Search .......... 707/100, 707/103, 10, 3, 1, 104.1, 203
See application file for complete search history.

(56) References Cited

U.S. PATENT DOCUMENTS

| | | | | |
|---|---|---|---|---|
| 5,857,180 | A * | 1/1999 | Hallmark et al. | 707/2 |
| 6,014,138 | A * | 1/2000 | Cain et al. | 715/826 |
| 6,026,365 | A * | 2/2000 | Hayashi | 705/9 |
| 6,111,579 | A * | 8/2000 | Alimpich et al. | 715/853 |
| 6,263,358 | B1 * | 7/2001 | Lee et al. | 718/100 |
| 6,353,820 | B1 * | 3/2002 | Edwards et al. | 707/2 |
| 6,474,881 | B1 | 11/2002 | Wanda | |
| 6,570,670 | B1 | 5/2003 | Salgado et al. | |
| 6,587,735 | B1 | 7/2003 | Yaguchi | |
| 6,604,110 | B1 * | 8/2003 | Savage et al. | 707/102 |
| 6,772,031 | B1 * | 8/2004 | Strand | 700/108 |

OTHER PUBLICATIONS

Ajwa et al. Applying parallel/distributed computing to advanced algegraic computations, Aerospace and Electronic conferences, 1997. NAECON 1997, IEEE 1997, National, vol. 1, pp. 156-164. □□.*
Bucur et al. Priorities among Multiple Queues for Processor Co-Allocation in Multicluster Sytems, Annual Simulation Sympsium, year 2003, pp. 15.*
International Search Report dated Sep. 16, 2003 related to PCT/US03/16990.

* cited by examiner

*Primary Examiner*—Jean M. Corrielus
*Assistant Examiner*—Baoquoc N. To
(74) *Attorney, Agent, or Firm*—Tucker Ellis & West

(57) ABSTRACT

A system and method is provided for providing a relational job request queue preferably for digital imaging devices. At least one parent queue data store is created for storing a plurality of parent queue records. At least one child queue data store is also created for storing a plurality of child queue records wherein each child queue record comprises a parent queue record identifier data store. A job request data store is also created for storing a plurality of job request records. For each job request received, a job request record is created and a record related to the newly created job request record is created in at least one of the parent queues or child queues.

29 Claims, 3 Drawing Sheets

RELATIONAL JOB QUEUE

BACKGROUND OF THE INVENTION

This invention pertains generally to job request queues, and more specifically to the implementation of a relational hierarchical job request queue.

There is a fundamental need to provide service for a variety of types of job requests in client-server systems. Modem digital imaging devices ("DID") are often capable of performing a variety of functions. DIDs suitably include devices such as printers, fax machines, scanners, copiers, multi-function peripherals ("MFPs"), and other like peripheral devices. Furthermore, a single computer can often access a plurality of different types of DIDs, which means that a single computer is capable of generating various types of job requests with various destinations. There exists a need to organize the various job requests sent from a user to any one of a plurality of types of DIDs connected to a network.

There also exists a need to provide both clients and administrators in a client-server environment with the ability to perform management functions on job request queues. It is preferable if clients have the ability to specify how a job should be processed. It is also preferable if clients have the ability to monitor jobs in a job request queue.

It is also preferable if administrators have the ability to create queues, assign priorities to queues, relate parent queues to child queues, move jobs between queues, etc.

BRIEF SUMMARY OF THE INVENTION

The present invention disclosed and claimed herein, in one aspect thereof, comprises a method for storing received job requests. The method comprises the steps of creating at least one parent queue data store for storing a plurality of parent queue records, wherein each record comprises a parent queue record identifier data store that is configured for storing a parent queue record identifier that is unique at least within the parent queue data store. The method further comprises the step of creating at least one child queue data store for storing a plurality of child queue records. Each of the child queue records suitably comprises a child queue record identifier data store and a parent queue record identifier data store. The child queue record identifier is preferably configured for storing a child queue record identifier that is unique at least within the child queue data store and. The method further comprises the step of creating a job request data store for storing a plurality of job request records, wherein each record comprises a job request record identifier data store that is configured for storing a job request record identifier that is unique at least within the job request data store. Also, the method comprises the step of creating for each received job request a record in the job request data store and a related record in at least one of the parent queue data store or child queue data store.

Also according to the present invention, there is provided a relational queue system for storing job requests a client-server network environment. The system comprises a data transport network, at least one client communicatively coupled to the data transport network, and at least one digital imaging device communicatively coupled to the data transport network. Also communicatively coupled to the network is a server comprising a job request table for storing information relative to job requests received from the at least one client, a parent queue table for organizing and servicing job requests, and at least one child queue table for organizing and servicing job requests, wherein the job request table, parent queue table, and the at least one child queue table for a relational database.

DETAILED DESCRIPTION OF THE INVENTION

The present invention provides a method and system for implementing a relational queue that is preferably compatible with a plurality of OS.

Figure 1:
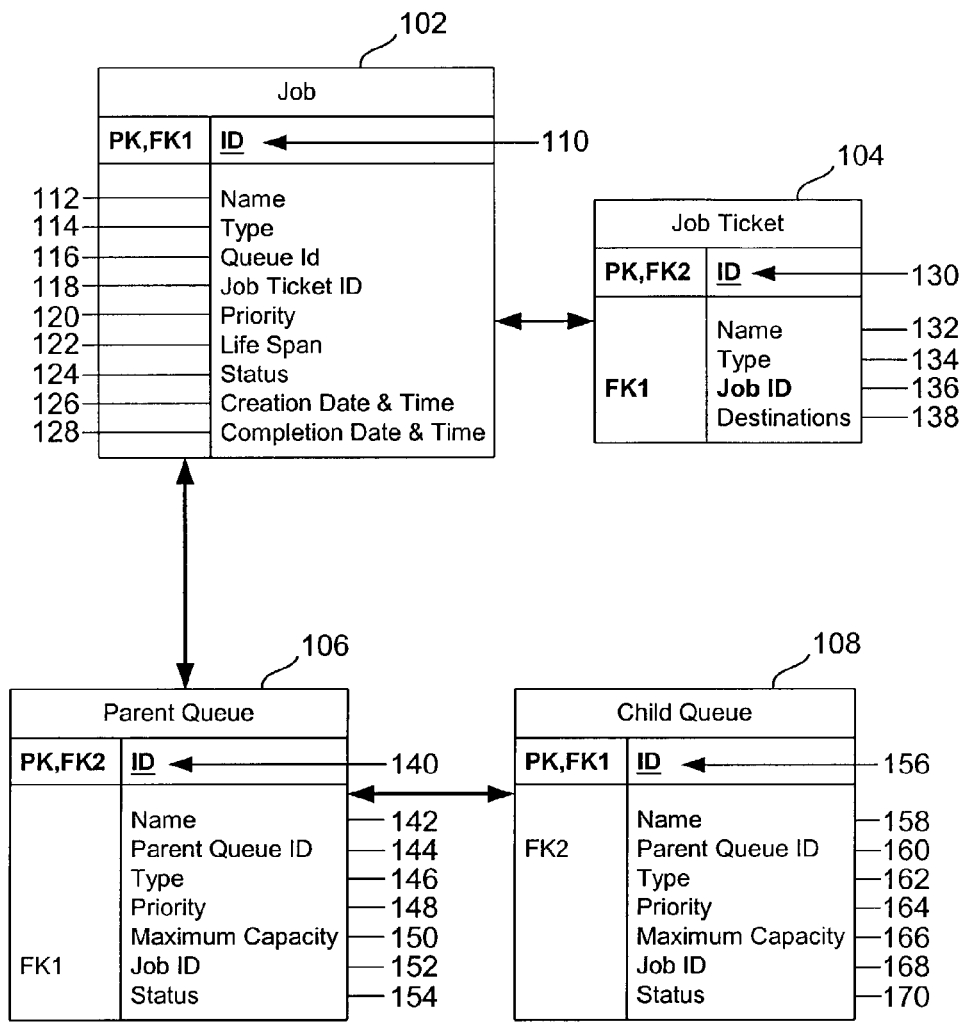
FIG. 1 illustrates a diagram of the organizational structure of a relational queue system according to the present invention.

Turning to FIG. 1, a diagram of the organizational structure of a relational queue system according to the present invention is provided. The system comprises at least three data stores, a job data store 102, a parent queue data store 106 and a child queue data store 108. The child queue data store is preferably related to at least the parent queue data store and the data stores preferably form a relational structure. In the presently preferred embodiment, the data stores are embodied as tables in a relational database, although it will be appreciated by those skilled in the art that flat files, markup based files such as XML, or other embodiments are also suitably used. For clarity purposes, the system will be described in terms of a relational database.

The job data store 102 preferably exists as a table in a relational database. It suitably comprises a plurality of records and each record suitably comprises a plurality of data stores. In database terms, the job table comprises a plurality of records having a plurality of fields. The records of the job data store 102 preferably comprises an identifier 110 that is unique at least within the job data store. This identifier 110 is suitably created as an auto-increment type field in a database.

Records stored in the job data store 102 also preferably comprise a job type data store 114. The job type data store 114 preferably stores information related to the type of job request that is received and stored as a record in the job data store 102. The job type data store 114 preferably stores data representing job types selected from the group consisting of: print job, private print job, fax job, scan job, document management job, etc.

Records stored in the job data store 102 also preferably comprise a job name data store 112. The job name data store 114 preferably stores descriptive information identifying a job request record. The descriptive information is suitably generated by automation procedures or manually.

Records stored in the job data store 102 also preferably comprise a job destination data store 138. The job destination data store 138 preferably stores descriptive information identifying a specific destination for a received job request. This information suitably identifies which component(s) will service a job request. As shown, the destination data store 138 is located in a job ticket data store 104. Preferably, the job ticket data store 104 is related to the job data store 102 in a one-to-one fashion. As such the information stored in the job ticket data store 104 is also suitably stored in the job data store 102. The job ticket data store 104 suitably comprises information relative to the manner in which the received jobs are to be serviced.

Records stored in the job data store 102 also preferably comprise a job priority data store 120. The job priority data store 120 preferably stores information related to the job priority. The job priority data store 120 preferably stores data selected from the group consisting of integers ranging from 0 to 10.

In addition, records stored in the job data store 102 also preferably comprise a job lifespan data store 122. The job lifespan data store 122 preferably stores date and time information. The stored date and time information suitably identifies a span during which a job must be serviced.

In addition, records stored in the job data store 102 preferably comprise a job status data store 124. The job status data store 124 preferably stores status information. The stored status information suitably is preferably data selected from the group consisting of: spooling, printing, scanning, faxing, private printing, ripping, creating jobs, etc.

Furthermore, the records stored in the job data store 102 preferably comprise a job creation time data store 126 and job completion time data store 128. These data stores preferably store both time and date information, which is suitably generated through automated means.

Each of the records of the parent queue data store 106 and child queue data store 108 preferably comprise an identifier 140 and 156 respectively that is unique at least within the respective queue data store. Furthermore, because the parent queue data store 106 and child queue data store 108 are preferably related, the child queue data store records preferably comprise a parent queue record identifier data store 160. It should be noted that the present invention is suitably embodied in a single queue data store wherein the records in the data store are related to one another through a parent queue data store. Also, the records stored in the parent queue data store 106 and child queue data store 108 preferably comprise a type data store 146 and 162, respectively.

It should be noted that while the system illustrated in FIG. 1 details a plurality of data stores, each configured to store a plurality of data fields or data stores, additional information is also suitably included in the data stores and additional data stores are suitably included without departing from the scope of the present invention.

Figure 2:
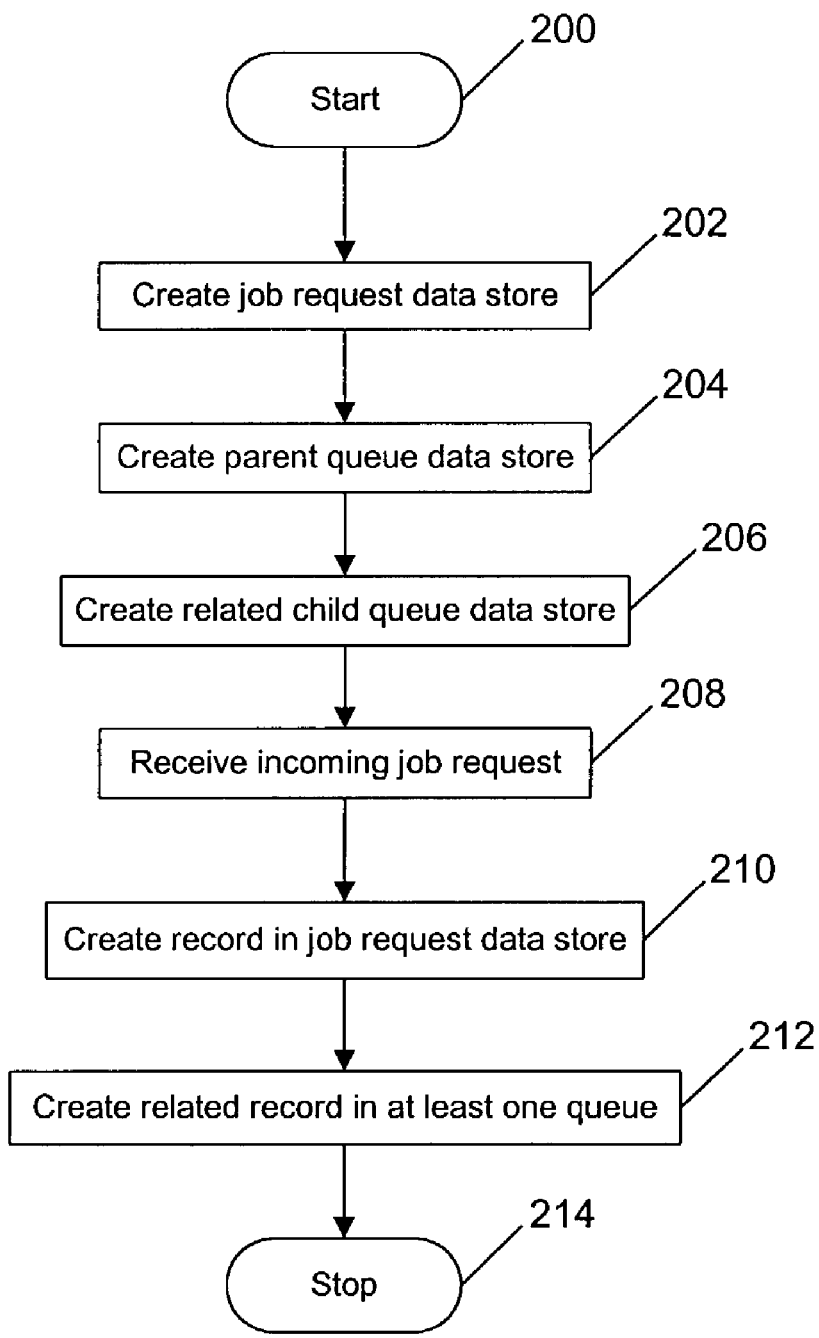
FIG. 2 illustrates a flow chart generally representing a method for creating a relational queue and storing received job requests according to the present invention.

Turning now to FIG. 2, a flow chart for creating a relational queue and storing received job requests is provided. The basic flow commences at start block 200, from which progress is made to process block 202 wherein a job request data store is created. Flow continues to process block 204 wherein a parent queue data store is created. Progression then flows to process block 206 wherein a child queue data store is created. The newly created child queue data store is preferably related to the parent queue data store created at process block 204.

Progression continues to process block 208 wherein an incoming job request is received, after which progression flows to process block 210. At process block 210, a new record is suitably created in the job request data store created at process block 202. Progression then continues to process block 212 wherein a new record is created in at least one of the parent and child queues created at process blocks 204 and 206 respectively. Flow then proceeds to termination block 214 where the process terminates.

Figure 3:
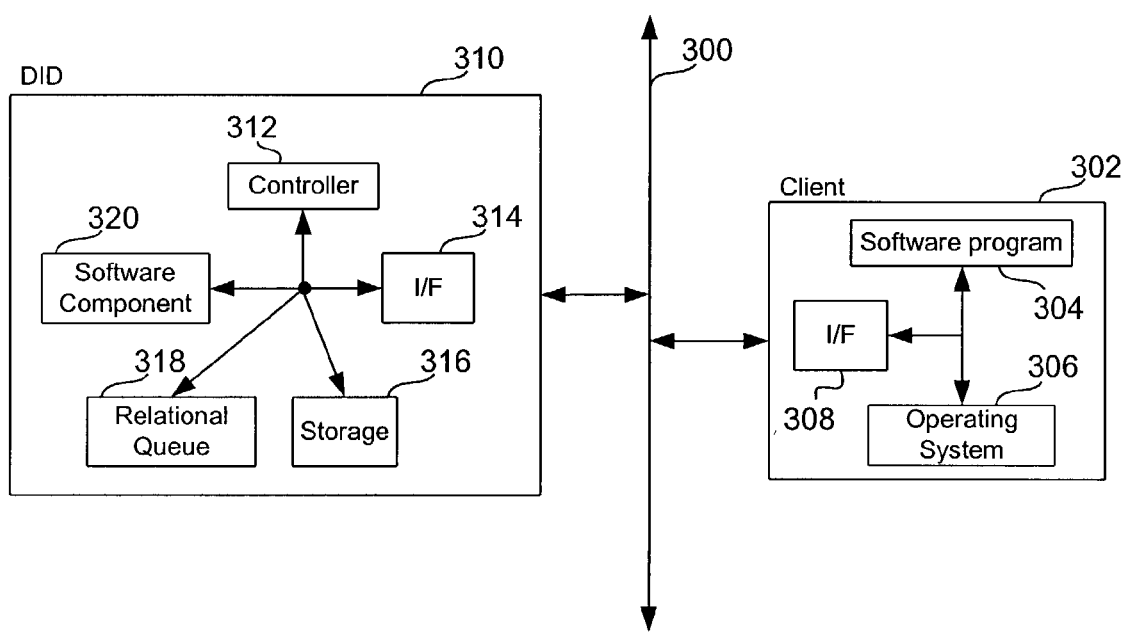
FIG. 3 illustrates the present invention in a network environment.

Turning now to FIG. 3, a system diagram illustrating a relational queue in a network environment in accordance with the present invention is provided. The system comprises a data transport network 300 illustrative of a LAN or WAN environment in which a preferred embodiment is provided. The network 300 is suitably any network and is suitably comprised of physical and transport layers such as illustrated by a myriad of conventional data transport mechanisms such as Ethernet, Token-Ring™, 802.11(b), or other wire-based or wireless data communication mechanisms as will be apparent to one of ordinary skill in the art. Connected to a data transport network 300 are a Client 302 and a Server 310. In the presently preferred embodiment, the Server 310 is a DID, although it will be appreciated by those skilled in the art that any server for accommodating selective query support, selective data access, data archiving, and the like.

One or more Clients, such as representative Client 302, is also placed, or selectively placed, in data communication with the data transport system 300. The Client 302 is preferably configured to interact with Server 310 as will be appreciated by one who is skilled in the art. It should be noted that the Client 302 is suitably a Thick Client or a Thin Client, additional server(s), personal digital assistant ("PDA"), or any equipment capable of interacting with Server 310 to send and receive data. Thus, a data path between Server 310 and the one or more Clients, such as representative Client 302, are in shared data communication. The Client 302 is preferably in data communication with a data transport network 300 through a network interface 308. The Client 302 preferably comprises storage, which is preferably a hard disk and random access memory ("RAM"), as will be appreciated by those skilled in the art. Stored on the storage is preferably an operating system 306 for controlling the Client 302. The operating system 306 is suitably any operating system, such as Windows (XP, 2000, NT, 9x, etc.), Macintosh, Unix, Linux, etc.

The server 310 is suitably any Server for accommodating selective query support, selective data access, data archiving, and the like, as will be appreciated to one of ordinary skill in the art, but is preferably a DID. It should be noted that in a case where the server 310 is not a DID, there is preferably a DID also connected to data transport network 300. The DID 310 is preferably in data communication with a data transport system 300 through a network interface 314. Thus, a data path between one or more DIDs, such as that illustrated by DID 310, is in shared data communication with at least one computer, such as that illustrated by Client 302.

The DID 310 is suitably any networked DID as will be appreciated to one of ordinary skill in the art. The DID 310 preferably has an internal device controller 312 suitably acting as a fully functional server with the necessary hardware and software that ensure proper operation of the DID 310 as will be appreciated by those skilled in the art. In addition, the DID 310 preferably comprises internal storage 316, which is preferably a hard disk and random access memory ("RAM") and is also suitably optical storage, removable memory, flash memory, or any other rewritable storage as will be appreciated by those skilled in the art. Preferably stored on storage 316 are the relational queue 318 and at least one software module or software component 320.

As will be appreciated by those skilled in the art, the relational queue is preferably a relational database as illustrated in FIG. 1, but is also suitably embodied as a markup language based document, such as XML, or as flat files, or any other searchable files. The software component ("SC") 320 is suitably computer-readable code written in any language and stored on a computer readable medium such as storage 316. The SC 320 is preferably compiled, pre-written code that defines interfaces and is callable to provide the functionality that the SC 320 encapsulates. SCs are typically packaged in "industry standard" ways such that they are callable from multiple languages, or from multiple environments. The computer-readable code, in the case of SCs is suitably a unit of independent deployment that has no persistent state. As such, it provides seamless integration with existing development tools, such Forte for Java or Microsoft Visual Studio. SCs are suitably used out-of-the-box, or extended and specialized by developers as desired. It should be noted that the SCs of the present invention are suitably designed for any language binding, such as Common Object Request Broker Architecture ("CORBA"), .NET, COM, DCOM, C++, ActiveX, etc., as will be appreciated by those skilled in the art. In the presently preferred embodiment, the SC 320 is a C++ SC that is callable from multiple languages, or from multiple environments, or operating systems.

In the presently preferred embodiment of the invention, job requests are sent preferably from the client 302 to the DID 310 across the data transport network 300. For example, a user of client 302 sends a print job request through the use of a DID driver, such as a printer driver, across data transport network 300 via network interface 308. In addition, the print job request is preferably sent by a software program 304, such as a word processing program or automation program, or by any other computer or user connected to the data transport network 300.

The print job request is preferably received by a SC 320 that is preferably stored on storage 316 of the DID 310. At least one SC 320 suitably performs the functionality described in FIG. 2. The SCs 320 preferably provide at least the following system functionality:

Create, delete, pause and resume jobs;
Move jobs between queues;
Promote and demote jobs in a queue;
Assign priorities to jobs;
Process jobs based on their priority;
Search for all jobs with specific criteria;
Create, delete, clone, pause and resume queues;
Assign priorities to queues;
Process queues based on their priority; and
Create configurable execution path (job ticket) for different job types.

In addition, at least one SC 320 preferably also provides functionality for selecting predefined parent and child queues of varying types. Preferably such functionality is limited to system administrators. In particular, SCs 320 preferably provide system administrators with at least the following functionality:

Create custom queues, wherein each queue has a separate queue data store;
Assign priorities to queues;
Associate parent queues with child queues. In the presently preferred embodiment, the child queues inherit all the characteristics of their parents unless an administrator chooses to overwrite an inherited behavior with a new behavior;
Move jobs between queues;
Promote and demote jobs in queues;
Delete jobs from queues;
Pause and resume queues; and
Clone predefined or custom queues.

Similarly, SCs 320 preferably provide users (clients 302) with at least the following functionality:

View the available queues to which a job can be submitted;

Create job ticket for a job describing how his job should be processed. In the presently preferred embodiment, the system provides a default job ticket if a client does not provide one.

Monitor the progress of a job;
Delete jobs that the client created from a queue; and
Pause and resume jobs in a queue that the client created.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A computer implemented method for distributed relational job queue management in a document processing system comprising the steps of:

creating at least one relational parent queue data table, for storing a plurality of parent queue records, each record comprising a parent queue record identifier data table that is configured for storing a parent queue record identifier that is unique at least within the relational parent queue data table;

creating at least one relational child queue data table, which at least one relational child queue table data is associated with the at least one relational parent queue data table and wherein the at least one relational child queue data table inherits a selected portion of the plurality of storage characteristics of the at least one relational parent queue data table, for storing a plurality of child queue records, each record comprising:

a child queue record identifier data table that is configured for storing a child queue record identifier that is unique at least within the relational child queue data table, and a parent queue record identifier data table; and creating a job request data table for storing a plurality of job request records, each record comprising a job request record identifier data table that is configured for storing a job request record identifier that is unique at least within the job request data table;

receiving document processing data representative of a selected document processing operation, which selected document processing operation includes at least one of job deletion, job priority assignment, job pause, job resume and job clone;

creating, in accordance with received document processing data and for each received job request, a record in the job request data table and a related record in at least one of the relational parent queue data table and the relational child queue data table; and receiving, from an associated administrator, queue management instructions relative to the at least one relational child queue table, the queue management instructions including at least one instruction from the set of assigning queue priority, moving of jobs between parent and child queues, job deletion, job suspension and job prioritization, wherein the relational parent queue data table and the relational child queue data table are a relational database table.

2. The method of claim 1 wherein the relational parent queue data table and relational child queue data table are the same data table.

3. The method of claim 1 wherein each job request record further comprises a job type data table.

4. The method of claim 3 wherein the step of creating a record in the job request data table further comprises the step of storing in the job type data table data representing job types selected from the group consisting of: print job, private print job, fax job, scan job, and combinations thereof.

5. The method of claim 1 wherein each job request record further comprises a job name data table.

6. The method of claim 1 wherein each job request record further comprises a job destination data table.

7. The method of claim 1 wherein each job request record further comprises information relative to the manner in which the job is to be serviced.

8. The method of claim 1 wherein each job request record further comprises a job priority data table.

9. The method of claim 8 wherein the step of creating a record in the job request data table further comprises the step of storing in the job priority data table data selected from the group consisting of: 0, 1, 2, 3, 4, 5, 6, 7,8,9, and 10.

10. The method of claim 1 wherein each job request record further comprises a job lifespan data table.

11. The method of claim 1 wherein each job request record further comprises a job status data table.

12. The method of claim 11 wherein the step of creating a record in the job request data table further comprises the step of storing in the job status data table data selected from the group consisting of: spooling, printing, scanning, faxing, private printing, ripping, creating jobs, and combinations thereof.

13. The method of claim 1 wherein each job request record further comprises a creation time data table and a completion time data table.

14. The method of claim 13 wherein the creation time data table and the completion time data table are configured for storing both date and time data.

15. The method of claim 1 wherein each parent request record further comprises a status data table.

16. A computer system for executing instructions on a processor for storing received job requests comprising:
    computer readable code on a computer readable medium for creating at least one relational parent queue data table for storing a plurality of parent queue records, each record comprising a parent queue record identifier data table that is configured for storing a parent queue record identifier that is unique at least within the relational parent queue data table;
    computer readable code on a computer readable medium for creating at least one relational child queue data table for storing a plurality of child queue records, each relational child queue data table being associated with at least one relational parent queue data table from which at least a portion of storage characteristics are inherited, each record comprising:
        a child queue record identifier data table that is configured for storing a child queue record identifier that is unique at least within the relational child queue data table, and
        a parent queue record identifier data table; and
    computer readable code on a computer readable medium for creating a job request data table for storing a plurality of job request records, each record comprising a job request record identifier data table that is configured for storing a job request record identifier that is unique at least within the job request data store table;
    computer readable code for receiving an instruction representative of a selected document processing operation including at least one of job deletion, job priority assignment, job pause, job resume and job clone;
    computer readable code on a computer readable medium for creating for each received job request a record in the job request data table and a related record in at least one of the relational parent queue data table and the relational child queue data table and
    computer readable code on a computer readable medium for receiving, from an associated administrator, queue management instructions relative to the at least one relational child queue table, the queue management instructions including at least one instruction from the set of assigning queue priority, moving of jobs between parent and child queues, job deletion, job suspension and job prioritization, wherein the relational parent queue data table and the relational child queue data table are a relational database table.

17. The system of claim 16 wherein the relational parent queue data table and the relational child queue data table are the same data table.

18. The system of claim 16 wherein the job request data table, the parent queue data table, and the child queue data table form a relational database.

19. The system of claim 16 wherein each job request record further comprises a job type data table.

20. The system of claim 16 wherein each job request record further comprises a job name data table.

21. The system of claim 16 wherein each job request record further comprises a job destination data table.

22. The system of claim 16 wherein each job request record further comprises information relative to the manner in which the job is to be serviced.

23. The system of claim 16 wherein each job request record further comprises a job priority data table.

24. The system of claim 16 wherein each job request record further comprises a job lifespan data table.

25. The system of claim 16 wherein each job request record further comprises a job status data table.

26. The system of claim 16 wherein each job request record further comprises a creation time data table and a completion time data table.

27. The system of claim 16 wherein the creation time data table and the completion time data table are configured for storing both date and time data.

28. A system for storing distributed job requests in a client-server network environment comprising:
    a data transport network;
    at least one client communicatively coupled to the data transport network;
    at least one digital imaging device communicatively coupled to the data transport network; and
    a server communicatively coupled to the data transport network including a processor for performing instructions providing:
        a job request table for storing information relative to job requests received from the at least one client, which job requests include data representative of a request of at least one of job deletion, job priority assignment, job pause, job resume and job clone,
        a relational parent queue data table, for organizing and servicing job requests, and
        least one relational child queue data table for organizing and servicing job requests, which at least one relational child queue data table is associated with the at least one relational parent queue data table and wherein at least one associated relational child queue data table inherits a selected portion of the plurality of storage characteristics of the at least one relational parent queue data table; and at least on queue management table for storing queue management instructions received from an associated administrator relative to the at least one relational child queue data table, the queue management instructions including at least one instruction from the set of assigning queue priority, moving of jobs between parent and child queues, job deletion, job suspension and job prioritization;

wherein the job request table, relational parent queue data table, the at least one relational child queue data table, and the queue management table form a relational database.

29. The system of claim 28 wherein the digital imaging device and the server are the same device.

* * * * *